US009902345B2

(12) United States Patent
Sekino et al.

(10) Patent No.: US 9,902,345 B2
(45) Date of Patent: Feb. 27, 2018

(54) PROTECTION STRUCTURE FOR SPRING PORTION OF POWER SUPPLY DEVICE

(71) Applicant: Yazaki Corporation, Tokyo (JP)

(72) Inventors: Tsukasa Sekino, Makinohara (JP); Hiroshi Yamashita, Makinohara (JP); Hiroaki Watanabe, Makinohara (JP)

(73) Assignee: Yazaki Corporation, Tokyo (JP)

( * ) Notice: Subject to any disclaimer, the term of this patent is extended or adjusted under 35 U.S.C. 154(b) by 423 days.

(21) Appl. No.: 14/761,446

(22) PCT Filed: Jan. 20, 2014

(86) PCT No.: PCT/JP2014/050926
§ 371 (c)(1),
(2) Date: Jul. 16, 2015

(87) PCT Pub. No.: WO2014/115674
PCT Pub. Date: Jul. 31, 2014

(65) Prior Publication Data
US 2015/0360628 A1 Dec. 17, 2015

(30) Foreign Application Priority Data

Jan. 22, 2013 (JP) .................................. 2013-009137

(51) Int. Cl.
*F16L 25/02* (2006.01)
*B60R 16/02* (2006.01)
(Continued)

(52) U.S. Cl.
CPC .......... *B60R 16/0215* (2013.01); *F16C 11/04* (2013.01); *H02G 11/00* (2013.01); *Y10T 16/5388* (2015.01)

(58) Field of Classification Search
CPC ............................. F16L 3/2053; F16L 3/2056
(Continued)

(56) References Cited

U.S. PATENT DOCUMENTS 1,425,011 A * 8/1922 Herron ............... F16M 11/2007
285/181
2,925,294 A * 2/1960 Schwartz ............ F16C 11/0647
248/276.1
(Continued)

FOREIGN PATENT DOCUMENTS

JP    2002-127844 A    5/2002
JP    2007-151257 A    6/2007
(Continued)

OTHER PUBLICATIONS

Notification of Reasons for Refusal dated Sep. 28, 2016, issued for the Japanese patent application No. 2013-009137 and English translation thereof.
(Continued)

*Primary Examiner* — Aaron M Dunwoody
(74) *Attorney, Agent, or Firm* — Locke Lord LLP (57) ABSTRACT

The present invention is to prevent sand or water from adhering to a spring member biasing a rotary member of a power supply device and thus cause the power supply device to smoothly and reliably perform a biasing operation of the rotary member over a long period. Provided is a protection structure for a spring member of power supply devices including: base members; cover members provided integrally with or separately from the base members; rotary members supported swingably by the base members and the cover members and leads out and holds a wire harness; and annular spring members biasing the rotary members in any one of swing directions, wherein the spring members are housed inside the cover members so that foreign matters are prevented from adhering to the spring member from the outside.

3 Claims, 7 Drawing Sheets

(51) Int. Cl.
*F16C 11/04* (2006.01)
*H02G 11/00* (2006.01)

(58) Field of Classification Search
USPC ....... 285/153.3, 184, 907; 16/277, 280, 281, 16/285
See application file for complete search history.

(56) References Cited

U.S. PATENT DOCUMENTS

| | | | | |
|---|---|---|---|---|
| 3,409,315 | A * | 11/1968 | Wichers | F21V 21/26 |
| | | | | 285/153.3 |
| 5,145,388 | A * | 9/1992 | Brownlie | H01R 4/5008 |
| | | | | 174/60 |
| 7,207,523 | B2 * | 4/2007 | Callahan | B60R 16/0207 |
| | | | | 174/10 |
| 8,242,366 | B2 * | 8/2012 | Katou | H02G 11/003 |
| | | | | 174/68.1 |
| 2007/0084619 | A1 | 4/2007 | Kisu et al. | |
| 2007/0119610 | A1 | 5/2007 | Kisu et al. | |
| 2014/0318860 | A1 * | 10/2014 | Kuji | H01R 13/639 |
| | | | | 174/72 A |

FOREIGN PATENT DOCUMENTS

| | | |
|---|---|---|
| JP | 2007-151377 A | 6/2007 |
| JP | 2011-024421 A | 2/2011 |
| JP | 2011-062015 A | 3/2011 |
| JP | 2011-062015 A | 3/2011 |

OTHER PUBLICATIONS

Supplementary European Search Report dated Aug. 31, 2016, issued for European patent application No. 14742784.3.
International Search Report dated Mar. 25, 2014, issued for PCT/JP2014/050926.

* cited by examiner

ABSTRACT# PROTECTION STRUCTURE FOR SPRING PORTION OF POWER SUPPLY DEVICE

TECHNICAL FIELD

The present invention relates to a protection structure for a spring portion of a power supply device which is mounted on, for example, a sliding door or a vehicle body for an automobile and is provided with a spring member configured to bias a member for swingably supporting a wire harness.

BACKGROUND ART

Conventionally, various power supply devices have been proposed to constantly supply power to a sliding door for an automobile, and, in particular, a power supply device for the purpose of compactness or the like is known which allows a wire harness for power supply to rotate in a horizontal direction using a swinging member according to opening and closing of a sliding door.

For example, Patent Literature 1 (not illustrated) discloses a power supply device which, on a sliding door side, includes a horizontal guide rail, a slider engaged with the guide rail, a first horizontally (front-back direction of a vehicle) rotatable arm pivotally supported on the slider and holding a corrugated tube of a wire harness, a second vertically (up-down direction of the vehicle) rotatable arm, and a torsion coil spring (resilient member) biasing the first arm in a door closing direction, thereby preventing a vehicle body from being interfered with a wire harness, which is arranged on the vehicle body side from the first arm, by biasing force of the torsion coil spring when the sliding door is fully opened.

In addition, Patent Literature 2 (not illustrated) discloses a power supply device which, on a sliding door side, includes a horizontal guide rail provided in a case, a slider engaged with the guide rail, a swing member provided rotatably in a horizontal direction on the slider, and a V-shaped spring-like resilient member provided on the swing member and is configured to bend and insert a wire harness to the slider and the swing member from the inside of the case and thus to arrange the wire harness on a vehicle body side, so that the swing member is rotated to the vehicle body by biasing force of the resilient member when the sliding door is fully closed, thereby smoothly bending the wire harness.

In addition, Patent Literature 3 (not illustrated) discloses a power supply device which includes a slider as a fixing member fixed to a sliding door and a swing member provided rotatably in a horizontal direction on the fixing member without using the case, the guide rail, and the resilient member disclosed in Patent Literature 2 described above and is configured to bend and insert a wire harness to the fixing member and the swing member and thus to arrange the wire harness on a vehicle body side.

CITATION LIST

Patent Literature

Patent Literature 1: JP 2002-127844 A (FIGS. 1 and 8)
Patent Literature 2: JP 2007-151257 A (FIGS. 1 and 4)
Patent Literature 3: JP 2007-151377 A (FIGS. 1 and 2)

SUMMARY OF INVENTION

Technical Problem

However, since the torsion coil spring in the power supply device disclosed in Patent Literature 1 described above is exposed, there have been concerns that foreign matters such as dust, sand, or water easily adhere to the torsion coil spring and the torsion coil spring is also deteriorated in elasticity or durability. These concerns may be similarly happen even when the torsion coil spring disclosed in Patent Literature 1 is applied to the power supply devices disclosed in Patent Literatures 2 and 3, for example.

In consideration of the above problems, an object of the present invention is to provide a protection structure for a spring portion of a power supply device which can prevent the adhesion of the foreign matters such as dust, sand, or water to the spring member and thus smoothly and reliably perform the biasing operation of the swinging member with the spring member over a long period in the power supply device for biasing the swinging member in any one of swing directions with the spring member.

Solution to Problem

In order to achieve the above object, a protection structure for a spring portion of a power supply device according to one aspect of the present invention of the present invention is characterized by including: a base member; a cover member provided integrally with or separately from the base member; a rotary member supported swingably by the base member and the cover member and leads out and holds a wire harness; and an annular spring member biasing the rotary member in any one of swing directions, wherein the spring member is housed inside the cover member so that foreign matters are prevented from adhering to the spring member from the outside.

According to the above configuration, the spring member is housed in the cover member and thus is protected from the foreign matters such as dust, sand, or water from the outside, so that malfunction, corrosion or the like of the spring member is prevented and the swing operating of the rotary member to be biased by the spring member is smoothly and reliably performed over a long period. The spring member is preferably a torsion coil spring (torsion coil spring). The power supply device is mounted, for example, on a vehicle body or a sliding door. The spring member is useful to bias the rotary member together with the wire harness, thereby preventing the interference of the wire harness with the vehicle body or smoothly bending the wire harness between the vehicle body and the sliding door.

A protection structure for a spring portion of a power supply device according to a first preferred aspect of the present invention is characterized in that: in the protection structure for the spring portion according to the one aspect of the present invention, the cover member is disposed at an upper side of the rotary member; a downward annular groove portion is provided inside the cover member and houses an upper half of the spring member; and an annular groove portion facing the downward annular groove portion is provided inside an upper portion of the rotary member and houses a lower half of the spring member.

According to the above configuration, the spring member is disposed on the upper portion of the power supply device and thus the entry and adhesion of the foreign matters such as dust, sand, or water to the spring member are suppressed. The insides of the upper and lower groove portions become spring housing spaces (housing chambers), and the annular spring member is housed in the upper and lower groove portions and is blocked from the outside. For example, the upper groove portion is formed between an annular outer peripheral wall of the cover member and an annular partition wall on the inner side of the cover member, and the lower groove portion is formed between the upper portion of an annular outer peripheral wall in the rotary member and an annular partition wall on the inner side of the rotary member. In order not to inhibit the rotation (swing) of the rotary member to the cover member, the lower end of the upper groove portion and the upper end of the lower groove portion come in weakly contact with each other or are positioned closer to each other. When the rotary member is pivotally supported on the cover member, the pivotally supported portions (shaft portion and bearing wall) are protected from the entry or adhesion of the foreign matters such as dust, sand, or water from the outside by the cover member.

A protection structure for a spring portion of a power supply device according to a second preferred aspect of the present invention is characterized in that: in the protection structure for the spring portion of the power supply device according to the one aspect of the present invention, the cover member is disposed at a lower side of the rotary member; a downward annular groove portion is provided inside the cover member and houses the spring member; and a lower opening of the cover member is covered with a lower cover.

According to the above configuration, the spring member is disposed on the lower portion of the power supply device and thus the entry and adhesion of the foreign matters such as dust, sand, or water to the spring member easily occur in ordinary circumstances, but since the spring member is housed in the downward groove portion of the cover member and is covered with the lower cover, the foreign matters such as dust, sand, or water are reliably prevented from entering and adhering to the spring member from above, sideways, or below. Preferably, a lower end edge of the downward groove portion comes in closely contact with the upper surface of the lower cover (seal the groove portion) so as to enhance waterproof and dustproof properties.

Advantageous Effects of Invention

According to the one aspect of the present invention, the spring member is housed in the cover member and thus is protected from the foreign matters such as dust, sand, or water from the outside, so that malfunction, corrosion or the like of the spring member is prevented and thus it is possible to smoothly and reliably perform the swing operating of the rotary member to be biased by the spring member over a long period and to improve reliability of normal power supply for the sliding door or the like of the vehicle.

According to the first preferred aspect of the present invention, the spring member is disposed on the upper portion of the power supply device and thus the entry and adhesion of the foreign matters such as dust, sand, or water to the spring member can be suppressed. In addition, the spring member is housed in a vacant chamber formed by the upper groove portion of the cover member and the lower groove portion of the rotary member and is blocked from the outside, so that the foreign matters such as dust, sand, or water can be reliably prevented from entering and adhering to the spring member.

According to the second preferred aspect of the present invention, the spring member is disposed on the lower portion of the power supply device and thus it is disadvantage in ordinary circumstances with respect to the entry and adhesion of the foreign matters such as dust, sand, or water to the spring member, but since the spring member is housed in the downward groove portion of the cover member and is covered with the lower cover, the foreign matters such as dust, sand, or water can be reliably prevented from entering and adhering to the spring member from above, sideways, or below.

BRIEF DESCRIPTION OF DRAWINGS

FIG. 7A illustrates examples in which a part of the power supply device on the vehicle body side is modified; FIG. 7A is a perspective view illustrating an operation of the power supply device when the sliding door is fully closed.

FIG. 7B illustrates examples in which a part of the power supply device on the vehicle body side is modified; FIG. 7B is a perspective view illustrating an operation of the power supply device when the sliding door is fully opened.

DESCRIPTION OF EMBODIMENTS

FIGS. 1 to 5 are diagrams illustrating a first embodiment of a protection structure for a spring portion of a power supply device according to the present invention. The power supply device is disposed on a vehicle body side of an automobile.

Figure 1:
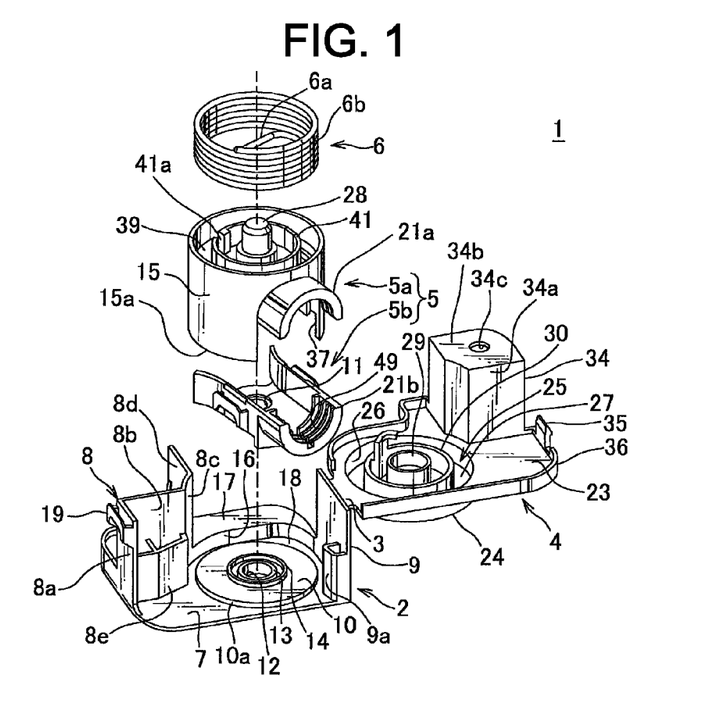
FIG. 1 illustrates a protection structure for a spring member of a power supply device according to a first embodiment of the present invention and is an exploded perspective view illustrating the protection structure for the spring portion of the power supply device on a vehicle body side.
Figure 2:
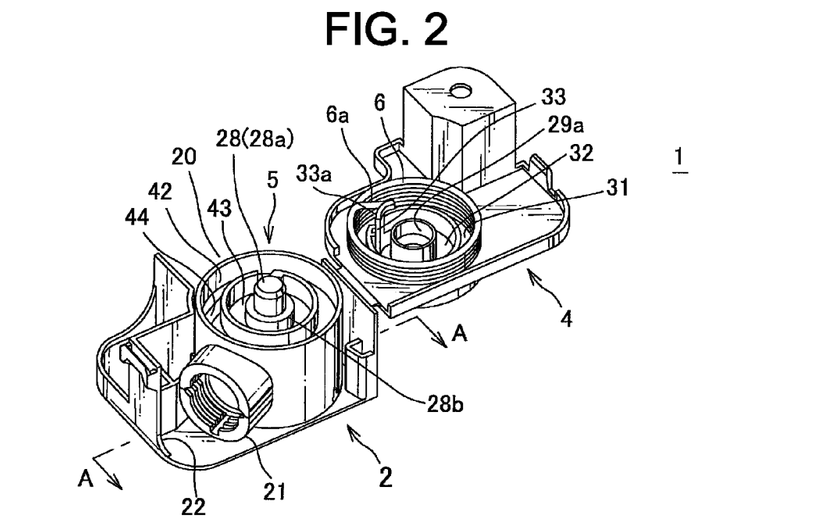
FIG. 2 is a perspective view illustrating a state in the middle of assembly of the power supply device, similarly.

As illustrated in FIGS. 1 and 2, such a power supply device 1 includes a synthetic resin-made base member 2, a synthetic resin-made cover member 4 which is openably and closably connected to an upper portion of the base member 2 by a flexible thin hinge (hinge) 3, a synthetic resin-made rotary member 5 as a swinging member swingably disposed between the base member 2 and the cover member 4 in a horizontal direction, and a metallic annular torsion coil spring (spring member or spring portion) 6 disposed between an upper portion of the rotary member 5 and the cover member 4 being in a closed state.

The base member 2 includes a horizontal board portion 7 and each of sidewalls (wall portions) 9 erected on the front and the back of the board portion 7, a circular projecting wall portion (disc portion) 10 is provided on an upper surface of the board portion 7 between both of the sidewalls 8 and 9, a circular bearing hole 12 supporting a lower side-central shaft portion 11 (see FIG. 3) of the rotary member 5 is provided to be penetrated through a center of the disc portion 10, a circular annular small-diameter rib 13 is provided on an upper edge of a bearing hole 12, and a circular and annular large-diameter rib 14 is concentrically provided around the rib 13.

The front sidewall 8 of the base member 2 is bent in a substantially crank shape when viewed from the plane and includes a vertical front end wall 8a, a vertical intermediate wall 8b substantially orthogonal to the front end wall 8a, a vertical curved wall 8c being continuous with the intermediate wall 8b, a vertical back wall 8d being continuous with the curved wall 8c and disposed stepwise in substantially parallel with the front end wall 8a, and a low protruding wall 8e protruding to each inner side of the front end wall 8a and the intermediate wall 8b. In the description, further, directions of front, back, right, left, up and down coincide with directions of the vehicle in which the power supply device 1 is mounted.

The curved wall 8c is formed concentrically with the hole portion 12 of the board portion 7, and an inner surface of the curved wall 8c comes close to an outer surface of an outer peripheral wall 15 of the rotary member 5 with a slight gap. A lower inner surface of the curved wall 8c is continuous with a right curved inner peripheral wall 16 which is raised from the board portion 7 in a low stepwise shape, and the inner peripheral wall 16 is continuous with the back sidewall 9 and is continuous with a right horizontal wall portion (one-step higher portion of the board portion 7) 17. A groove-like portion 18 having the upper surface of the board portion 7 as a bottom is formed between a vertical annular low outer peripheral surface 10a of the disc portion 10 and the back sidewall 9 being continuous with the inner peripheral wall 16 and the curved wall 8c. An inner peripheral surface of a lower end portion 15a of the outer peripheral wall 15 of the rotary member 5 comes close to the outer peripheral surface 10a of the disc portion 10 with a slight gap.

A locking frame piece 19 to the cover member 4 is provided at the upper outer surface of the front end wall 8a of the front sidewall 8. A right opening 20 (see FIG. 2) is formed between the back wall 8d and a right end of the back sidewall 9 to horizontally lead out a wire harness from the rotary member 5, and a left wide opening 22 (see FIG. 2) having approximately a fan shape is formed between the front end wall 8a and a left end of the back sidewall 9 to rotate a harness lead-out wall 21 (see FIG. 2) protruding toward a left side of the rotary member 5.

The back sidewall 9 has a low protruding wall 9a at a left end side of an inner surface thereof. Each of the front and back protruding walls 8e and 9a acts as a stopper for regulating a rotating angle of the rotary member 5. The cover member 4 is connected to an upper end of the back sidewall 9 through the thin hinge 3. The base member 2 and the cover member 4 constitute a support body with respect to the rotary member 5 or the torsion coil spring 6. In the following description, directions of front, back, right, left, up and down of the cover member 4 indicate directions when the cover member 4 is assembled to the base member 2.

The cover member 4 includes an upper wall portion 23 being in a horizontal state when being assembled to the base member 2, a convex portion 24 protruding upward from the upper wall portion 23 and provided in a circular and annular shape, a circular outer peripheral wall 26 and a circular top wall 27 in a concave portion 25 formed inside the convex portion 24, a circular and cylindrical bearing wall 29 provided at a center of the concave portion 25 and supporting a shaft portion 28 having a circular cross-section on an upper center of the rotary member 5, and a circular and annular partition wall 30 provided on an inner surface of the top wall 27 and disposed concentrically outside the bearing wall 29.

An inner peripheral surface of the outer peripheral wall 26 of the concave portion 25 is provided to be concentric with the bearing wall 29 and the partition wall 30. An annular large-diameter groove portion 31 (see FIG. 2) is formed between the outer peripheral wall 26 and the partition wall 30, an annular medium-diameter groove portion 32 (see FIG. 2) is formed between the bearing wall 29 and the partition wall 30, and a non-penetration small diameter bore portion 29a (see FIG. 2) is formed inside the bearing wall 29. An upper half of the torsion coil spring 6 (see FIG. 2) is housed in the large diameter groove portion 31, and the upper shaft portion 28 of the rotary member 5 is inserted into the bore portion 29a.

A slit-like cutout portion 33 (see FIG. 2) is provided on the partition wall 30, and a hook piece 33a is projected downward on one end side of the cutout portion 33 to hook an inward protruding end (not illustrated) on the upper end of the torsion coil spring 6. The inward protruding end on the upper end of the torsion coil spring 6 is housed in the inside groove portion 32 of the partition wall 30.

The concave portion 25 of the cover member 4 is disposed at a position (back half of the upper wall) closer to the thin hinge 3 of the upper wall 23, a long fixing wall portion 34 extends downward on the right side of the front half of the upper wall 23, a locking claw portion 35 is projected downward closer to the fixing wall portion 34, and an outer periphery of the upper wall 23 is provided with a short vertical flange portion 36 projecting downward, but excludes a placement portion of the thin hinge 3, the fixing wall portion 34, and the claw portion 35.

An inner surface of a vertical portion 34a of the fixing wall portion 34 is disposed to come in contact with the outer surface of the front sidewall 8 of the base member 2, a horizontal portion 34b is integrally provided at a lower end of the of the vertical portion 34a of the fixing wall portion 34, a hole portion 34c is provided in the horizontal portion 34b to insert a bolt or a locking clip, and the horizontal portion 34b is fastened together and firmly fixed to a vehicle body (not illustrated) with the bolt or the locking clip in a state where the hole portion 34c is overlapped with a hole portion (not illustrated) of the one-step higher board portion 17 on the right side of the base member 2. The claw portion (locking unit) 35 of the cover member 4 is engaged with a frame piece (locking unit) 19 of the base member 2. For example, the shape of the locking unit can be appropriately set.

Figure 3:
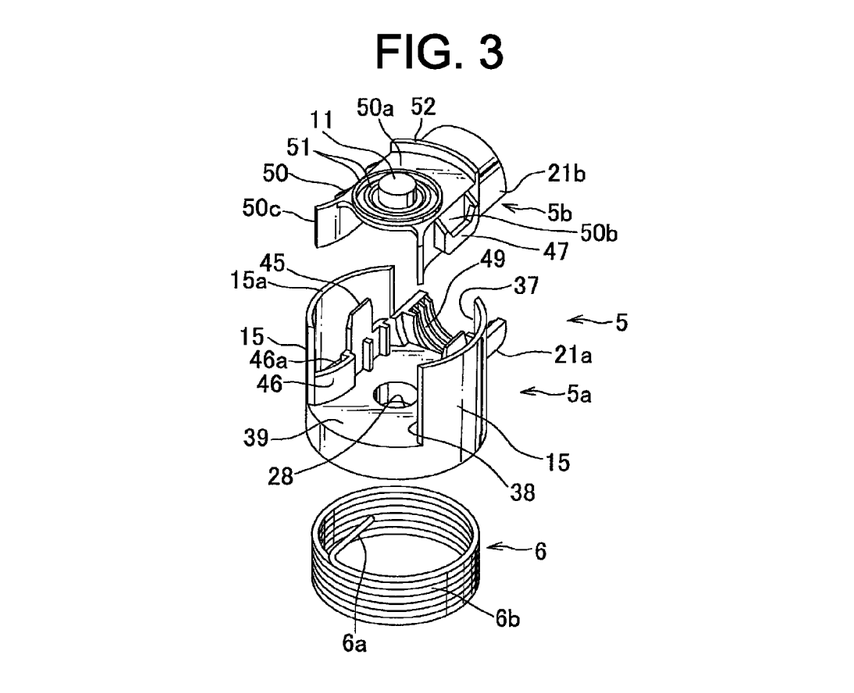
FIG. 3 is an exploded perspective view illustrating a state where a swing rotary member and a spring member for biasing the swing rotary member in the power supply device are vertically reversed.

As illustrated in FIGS. 1 and 2 and FIG. 3 (a vertically-reversed exploded perspective view), the rotary member 5 is made up of an upper main body portion (upper member) 5a and a lower sub-body portion (lower member) 5b, and the main body portion 5a includes a vertical circular and annular (an arc shape in part) outer peripheral wall 15 in which both right and left sides are cut and opened in a rectangular shape (cutout opening portions indicated by reference numerals 37 and 38 in FIG. 3), a circular horizontal upper wall 39 provided inside the upper portion of the outer peripheral wall 15, an upward shaft portion 28 provided at the center of the upper wall 39, a circular and annular partition wall 41 provided concentrically with the shaft portion 28 in the middle of the upper wall 39, and a semi-annular (semi-circular cross-section) harness lead-out wall (holding wall) 21a projecting to the left in the upper portion of the left cutout opening 37.

The upper shaft portion 28 protrudes higher than the partition wall 41 or the outer peripheral wall 15. The partition wall 41 is provided with a slit-like cutout portion 41a for locking an inward protruding end 6a on the lower end of the torsion coil spring 6. The lower half of the torsion coil spring 6 is housed in a large diameter groove portion 42 (see FIG. 2) between the outer peripheral wall 15 and the partition wall 41, and the protruding end 6a on the lower end of the torsion coil spring 6 protrudes to an inner groove portion 43 (see FIG. 2) of the partition wall 41 from the cutout portion 41a. The upper shaft portion 28 is formed in two upper and lower steps of an upper-half small diameter portion 28a (see FIG. 2) and a lower-half large diameter portion 28b, the upper-half small diameter portion 28a is engaged with the bearing hole 29a of the cover member 4. A hole portion 44 (see FIG. 2) for drainage or the like is provided in a long hole shape on a part of the upper wall 39, which is a bottom wall of the large diameter groove portion 42, in a circumferential direction, and the hole portion 44 communicates with a lower space 46a (see FIG. 3) closer to the inner peripheral surface of the outer peripheral wall 15.

As illustrated in FIG. 3, an inner space of the upper shaft portion 28 is provided in a lower surface (inner surface) of the upper wall 39 in the main body portion 5a of the rotary member 5, a pair of front and back claw portions 45 for locking with respect to the lower sub-body portion 5b are projected downward in the inside of the front and back outer peripheral walls 15 of the rotary member 5, a pair of front and back curved walls 46 opened into an approximately truncated chevron shape are provided at a right side of each claw portion 45, and the lower end of the curved wall 46 is disposed so as to have the same height as the lower end of the left harness lead-out wall 21a having a half-split shape.

The claw portion 45 and the frame piece 47 serving as each of locking units (locking portion and locked portion) of the main body portion 5a and the sub-body portion 5b are disposed to be hidden inside the outer peripheral wall 15, so the appearance from the outside is improved. The hole portion 44 (see FIG. 2) for the drainage or the like on the upper wall 39 communicates with the space 46a between the curved wall 46 and the outer peripheral wall 15. A plurality of ribs 49 are provided in parallel on the inner peripheral surface of the harness lead-out wall 21a and are engaged with recessed portions (recessed grooves) on the outer periphery of a synthetic resin-made corrugated tube 48 (see FIGS. 7A and 7B).

As illustrated in FIG. 3, the sub-body portion 5b of the rotary member 5 is made up of a right-half portion 50 having approximately a U-shaped cross-section and a left-half harness lead-out wall (holding wall) 21b having a semi-circular cross-section, the lower shaft portion 11 and two circular and annular concentric ribs 51 around the shaft portion 11 are provided on the lower surface of a horizontal bottom wall 50a of the right-half portion 50, the locking frame piece 47 is provided on the outer surface of front and back sidewalls 50b and is engaged with the claw portion 45 of the main body portion 5a. The lower shaft portion 11 is rotatably (slidably) engaged with the hole portion 12 on the board portion 7 of the base member 2 (see FIG. 1), and two ribs 51 are rotatably engaged with the outside of each of the ribs 13 and 14 of the disc portion 10 of the base member 2 as illustrated in FIGS. 4 and 5.

A curved wall 50c having approximately a truncated chevron shape on the right end side of the front and back sidewalls 50b of the sub-body portion 5b (see FIG. 3) is joined to the inner curved wall 46 of the main body portion 5a to form the other (toward a sliding door side) harness lead-out wall. In addition, a downward rib 52 of the large diameter arc shape is projected to a left end of the bottom wall 50a of the sub-body portion 5b, and the rib 52 is continuous with the lower end portion 15a of the front and back outer peripheral walls 15 of the main body portion 5a in a circular (arc shape) shape to form a part of the outer peripheral walls 15 and closely faces the outer peripheral surface 10a of the disc portion 10 of the base member 2 illustrated in FIG. 1 with a slight gap.

The torsion coil spring 6 in the present example includes a plurality of wound portions 6b (approximately, seven and eight loops) wound in a circular and spiral shape with no gap and protruding ends 6a protruding linearly inward from a lower-end wound portion and an upper-end wound portion, respectively, so that the wound portions 6b are twisted in a diameter reducing direction, thereby generating resilience-reaction force (spring force).

Figure 4:
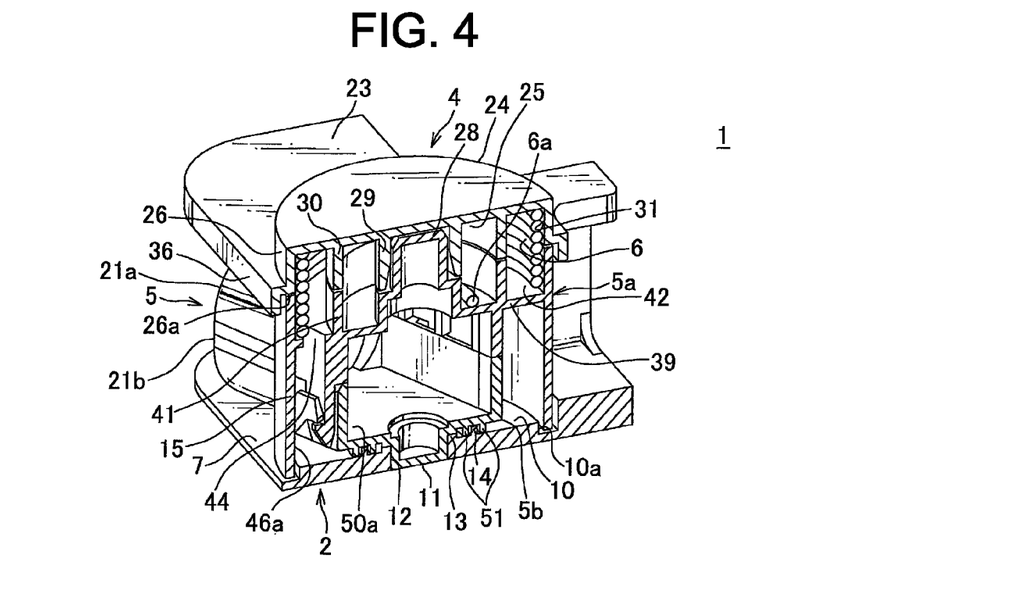
FIG. 4 is a perspective view illustrating an assembly state of the power supply device when viewed in the arrow direction by taking along the line A-A in FIG. 2.
Figure 5:
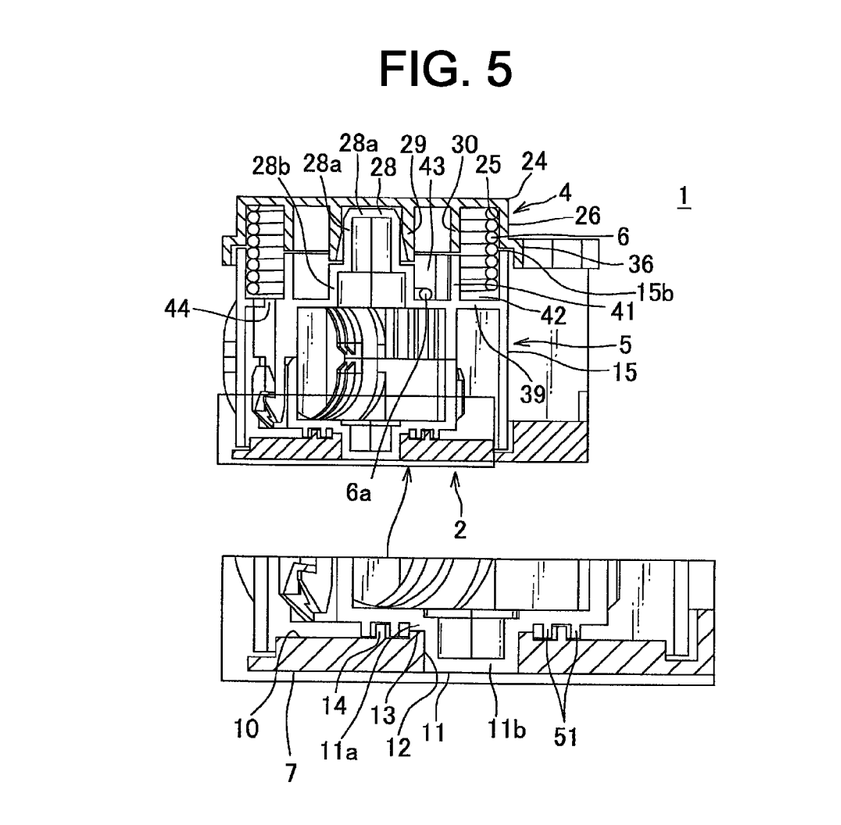
FIG. 5 is a cross-sectional view illustrating the assembly state of the power supply device when viewed in the arrow direction by taking along the line A-A (the inside of the frame illustrates an enlarged view), similarly.

As illustrated in FIGS. 4 and 5 (a diagram when viewed in an arrow A direction by taking along the line A-A in a state where the power supply device 1 illustrated in FIG. 2 is assembled), the rotary member 5 made up of the main body portion 5a and the sub-body portion 5b is swingably assembled between the base member 2 and the cover member 4, the lower half of the torsion coil spring 6 is housed in the annular groove portion 42 closer to the outer periphery on the upper portion of the rotary member 5 in a state the upper and lower protruding ends 6a of the torsion coil spring 6 are locked to the cover member 4 and the rotary member 5, and the upper half of the torsion coil spring 6 is housed in the annular groove portion 31 closer to the outer periphery of the cover member 4. One end of the corrugated tube 48 (see FIGS. 7A and 7B) for the wire harness is held between the harness lead-out walls 21a and 21b which are provided on the main body portion 5a and the sub-body portion 5b of the rotary member 5, respectively. The torsion coil spring 6 is covered with the cover member 4, so that foreign matters such as dust, sand, or water are prevented from adhering to the torsion coil spring from the outside and thus the torsion coil spring is securely protected.

The lower end (lower surface of the upper wall 23) 26a of the outer peripheral wall 26 of the convex portion 24 (portion having the concave portion 25 on the inside) protruding upward from the upper wall 23 of the cover member 4 comes close to the upper end of the outer peripheral wall 15 of the rotary member 5 with the slight gap (since the rotation of the rotary member 5 can be hindered when the contact is strong, the weak contact may be acceptable) in the state where the cover member 4 is locked to the base member 2 with the locking units 19 and 35 (see FIG. 1) and, moreover, the inner surface of the downward flange portion 36 on the outer periphery of the upper wall 23 comes close to the outer surface on the upper end of the outer peripheral wall 15 of the rotary member 5 with the slight gap, so that the foreign matters are prevented from entering into the outward annular groove portion 42, that is, a spring housing space between the convex portion 24 of the cover member 4 and the rotary member 5 from above and sideways.

The torsion coil spring 6 is positioned closer to the inner peripheral surface between the outer peripheral wall 26 of the convex portion 24 in the cover member 4 and the outer peripheral wall 15 of the rotary member 5 in a free state, and the rotary member 5 is rotated in a back side of the vehicle (in a counterclockwise direction in FIG. 4) from that state, so that the torsion coil spring 6 is compressed (reduced in diameter) and thus generates forward resilience-reaction force.

Since the hole portion 44 is provided on the bottom wall (upper wall) 39 of the outward annular groove portion 42 in the rotary member 5 and the hole portion 44 communicates with the inner space 46a on the outer peripheral wall 15 of the rotary member 5 in the outside of the lower sub-body portion 5b, that is, the outside of the harness lead-out wall 50c (see FIG. 3), even when the foreign matters such as dust, sand, or water enter into the upper groove portion 42 as a spring housing space, the foreign matters are discharged to the outer board portion 7 through the disc portion 10 of the lower base member 2 from the hole portion 44 and the adhesion of the foreign matters to the torsion coil spring 6 is reliably prevented.

Since the annular ribs 13 and 14, which are disposed between two annular ribs 51 on the bottom wall 50a of the sub-body portion 5b in the rotary member 5 to closely face each other with the slight gap, are projected upward in the disc portion 10 of the base member 2 and a labyrinth structure having a longitudinal cross-section of a rectangular wave shape is formed by these ribs 13, 14, and 51, even when the foreign matters fall through the hole portion 44 of the upper wall 39 from the upper spring housing space 42, the entry of the foreign matters into the lower shaft portion 11 of the rotary member 5 is reliably prevented by the labyrinth structure and the foreign matters fall along the outer peripheral surface 10a of the disc portion 10 from the upper surface of the disc portion 10, thereby being discharged to the outside from the gap between the lower end of the outer peripheral wall 15 of the rotary member 5 and the upper surface of the board portion 7 and the sliding contact between the bearing hole 12 of the base member 2 and the lower shaft portion 11 of the rotary member 5 is constantly smoothly performed over a long period.

The labyrinth structure formed by these ribs 13, 14, and 51 prevents the foreign matters from riding over the disc portion 10 of the base member 2 from the lower end of the outer peripheral wall 15 of the rotary member 5 (the foreign matters hardly ride over the step 10a of the disc portion 10) and also prevents the foreign matters from reaching the lower shaft portion 11. The lower shaft portion 11 is continuous with an upper stepwise large-diameter portion (step portion) 11a (see FIG. 5), and the lower surface of the large diameter portion 11a slidably contacts with the upper surface of the annular rib 13 on the upper edge of the bearing hole 12 of the base member 2. Even though the bearing hole 12 of the base member 2 penetrates upward and downward, since a horizontal panel portion (not illustrated) of the vehicle body comes in closely contact with the lower side of the bearing hole 12 (the lower side of the board portion 7 of the base member 2), there is no concern that the foreign matters enter into the bearing hole 12 from the lower side.

As in the lower labyrinth structures 13, 14, and 51, an upper labyrinth structure is formed by the outer peripheral wall 26 of the convex portion 24 in the cover member 4, the downward flange portion 36 disposed outside the outer peripheral wall 26, the outward annular partition wall 30 disposed inside the outer peripheral wall 26 (in the concave portion 25), the annular (cylindrical) bearing wall 29 disposed inside the partition wall 30, the upper portion 15b of the outer peripheral wall 15 in the rotary member 5, the annular partition wall 41 disposed inside the upper portion of the outer peripheral wall 15, and the shaft portion 28 protruding upward higher than the partition wall 41 in the inside of the partition wall 41, that is, the large-diameter annular lower half (portion not slidably contacting with the inner peripheral surface of the bearing wall 29 in the cover member 4) 28b of the shaft portion 28. The outer peripheral wall 26, the partition wall 30, and the bearing wall 29 of the convex portion 24 in the cover member 4 are disposed concentrically with each other, and the outer peripheral wall 15, the partition wall 41, and the upper shaft portion 28 in the rotary member 5 are disposed concentrically with each other.

Although the upper shaft portion 28 is hollow similarly to the lower shaft portion 29, a tip of the small diameter upper half 28a of the upper shaft portion 28 is closed by an upper end wall 28a' (similarly, a tip of the lower shaft portion 11 is closed by a lower end wall 11b), and the outer peripheral surface of the upper half 28a on the upper shaft portion 28 is supported to come in slidably contact with the inner peripheral surface of the bearing wall 29 in the cover member 4. Each of the upper and lower shaft portions 11 and 28 can be a solid rather than the hollow.

In a case where the foreign matters enters into the outward annular groove portion (spring housing space or housing chamber) 42 on the inner side from the gap between the upper end 15b of the outer peripheral wall 15 in the rotary member 5 and the lower end of the outer peripheral wall 26 of the convex portion 24 in the cover member 4 and no hole portion 44 for discharging the foreign matters exists in the bottom wall 39 of the annular groove portion 42, since the upper and lower annular partition walls 30 and 41 are disposed at the inside between the outer peripheral wall 15 and the convex portion 24 and the inside between the outer peripheral wall 26 and the rotary member 5, respectively, to face each other with the slight gap, the foreign matters are prevented from entering to the inner annular groove portion 43 of the partition wall 41 by each of the upper and lower partition walls 30 and 41 and the foreign matters are prevented from adhering to the protruding end 6a on the lower end of the torsion coil spring 6 housed in the annular wall portion 43.

Even in a case where the foreign matters have already entered into the inner annular groove portion 43 of the partition wall 41, since the large-diameter lower half 28b of the upward shaft portion 28 is not engaged with the inside of the bearing wall 29 in the cover member 4, there is no problem when the foreign matters adhere to the lower half 28b of the shaft portion 28 and since the bearing wall 29 of the cover member 4 faces the upper side of the large-diameter lower half 28b with the slight gap, the entry of the foreign matters into the small-diameter upper half 28a (between the upper half 28a of the shaft portion 28 and the bearing wall 29) of the shaft portion 28 is prevented by the bearing wall 29. Thus, the upper half 28*a* of the shaft portion 28 smoothly and reliably rotates in the circumferential direction while coming in slidably contact with the inside of the bearing wall 29 over a long period without being affected by the foreign matters, and the swing operation of the rotary member 5 is smoothly and reliably performed over a long period.

Furthermore, in a case where abrasion powders of synthetic resin are caused by the abrasion due to the sliding contact between the upper shaft portion 28 of the rotary member 5 and the bearing wall 29 of the cover member 4 over a long period, since the upper and lower annular partition walls 30 and 41 are provided between the shaft portion 28 and the torsion coil spring 6 and the bearing wall 29 and the torsion coil spring 6, respectively, and the lower end surface of the upper partition wall 30 (in the cover member 4) and the upper end surface of the lower partition wall 41 (in the rotary member 5) come in contact with each other (come close to each other or weakly contact with each other), the adhesion of the abrasion powders to the torsion coil spring 6 is prevented by the upper and lower partition walls 30 and 41.

Figure 6:
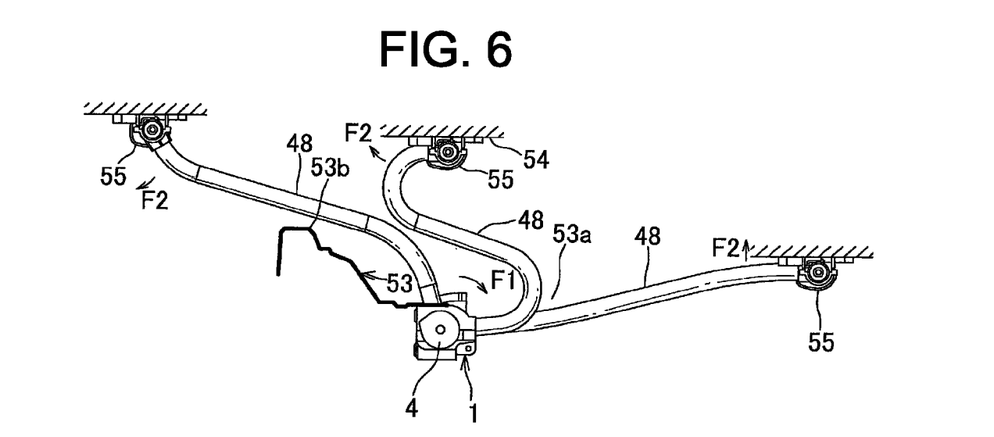
FIG. 6 is a plane view illustrating an operation of a wire harness between a vehicle body side and a power supply device and between a sliding door side and a power supply device every time the sliding door is opened and closed.

FIG. 6 illustrates a state where the above-described power supply device 1 is mounted on the bottom of an entrance 53*a* of a vehicle body 53 and a wire harness with the corrugated tube 48 is horizontally arranged from the power supply device 1 to a power supply device 55 to be described below of a sliding door 54 on a left side of the vehicle, and the right side (front side of the vehicle), the center, and the left side (back side of the vehicle) of FIG. 6 illustrate a fully closed state, a half-opened state, and a fully opened state of the sliding door with a solid line for convenience, respectively.

Figure 7A:
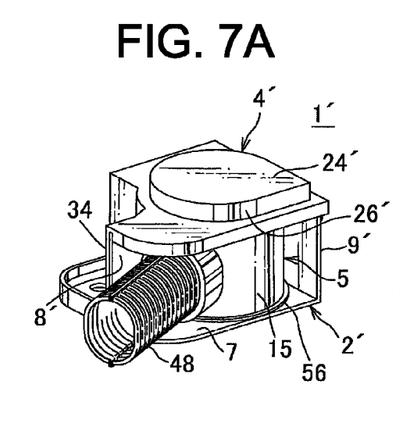
Figure 7B:
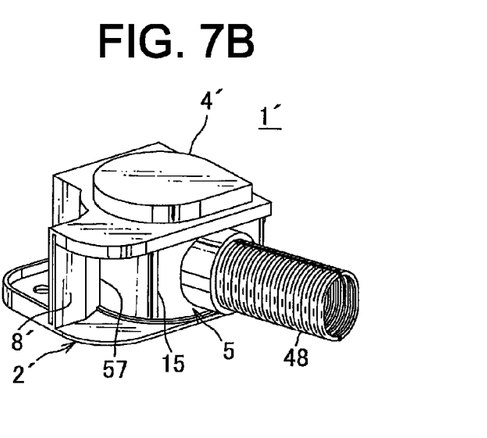
Figure 7C:
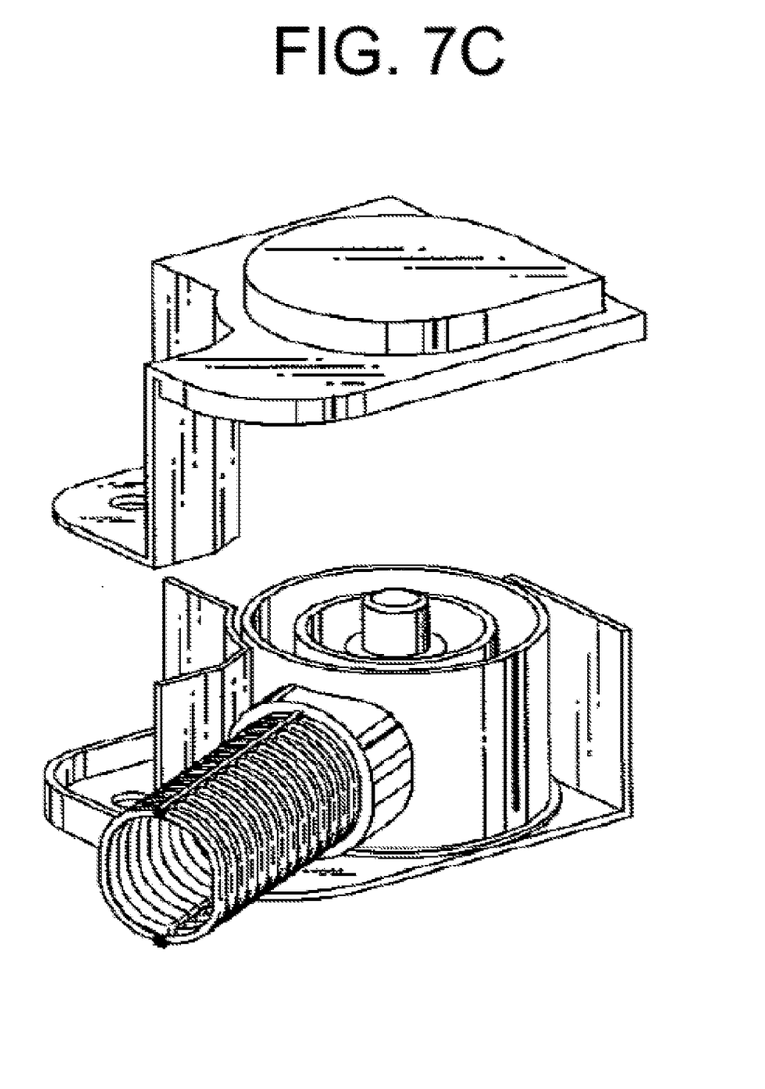
FIG. 7C is a perspective view illustrating the cover member provided separately from the base member.

FIG. 7A illustrates a fully closed state of a sliding door of a power supply device on the vehicle body side as viewed from the left side (sliding door side) of the vehicle, and similarly, FIG. 7B illustrates a fully opened state of the sliding door of the power supply device as viewed from the left side (sliding door side) of the vehicle.

A power supply device 1' illustrated in FIGS. 7A and 7B is obtained by partially changing the shape of a base member 2' and a cover member 4' compared with the power supply device 1 illustrated in FIG. 1. For example, the cover member 4' is formed separately from the base member 2' without being connected to each other with the hinge, the shape of front and back sidewalls 8' and 9' of the base member 2' is simplified, the protruding end (not illustrated) on the upper end of the torsion coil spring 6 (see FIG. 1) protrudes outward and thus is locked to an approximately circular outer peripheral wall 26' of a convex portion 24', and the board portion 7 of the base member 2' is provided with an annular rib 56 which comes close to the outside of the lower end portion on the outer peripheral wall 15 of the rotary member 5 and constitutes a labyrinth structure.

As illustrated in the right side of FIG. 6 and FIG. 7A, when the sliding door 54 is fully closed, the torsion coil spring (spring member) 6 of the power supply devices 1 and 1' on the vehicle body side is provided integrally with the rotary member 5 to bias the wire harness (substituted by reference numeral 48) in a clockwise direction (in a closing direction of the sliding door and toward the inside of the vehicle body 53) as indicated by an arrow F1, so that the wire harness 48 is forward pulled and extends toward the power supply device 55 on the sliding door side in a state of an approximate straight line along the vehicle body 53 without protruding to the outside (sliding door side) from the vehicle body 53. Further, the wire harness is actually made up of the corrugated tube 48 and a plurality of electric wires inserted into the corrugated tube.

Then, as illustrated in the center of FIG. 6, when the sliding door 54 is half-opened, the wire harness 48 is biased by the torsion coil spring 6 of the power supply device 1 on the vehicle body side in the closing direction of the sliding door and toward the inside of the vehicle as indicated by the arrow F1, so that the wire harness is smoothly bent in a substantially S-shape without being buckled and an excessive length of the harness is absorbed.

Furthermore, as illustrated in the left side of FIGS. 6 and 7B, when the sliding door 54 is fully opened, the torsion coil spring 6 of the power supply devices 1 and 1' on the vehicle body side is provided integrally with the rotary member 5 to bias the wire harness 48 in the closing direction of the sliding door as indicated by an arrow F1, so that the wire harness portion 48 led out from the power supply devices 1 and 1' on the vehicle body side is separated forward from a portion (a portion protruding toward the outside of the vehicle) 53*b* on the back end side of the entrance 53*a* of the vehicle body 53 and thus is prevented from the interference with the protruding portion 53*b* on the back end side of the entrance of the vehicle body 53.

As illustrated in FIG. 7B, since the electric wire portion of the wire harness 48 is inserted and housed into/in the outer peripheral wall 15 of the rotary member 5 in the power supply device 1', the appearance from the outside is excellent, and since the gap 57 between the outer peripheral wall 15 of the rotary member 5 and the front sidewall 8' of the base member 2' is suppressed small, there is no concern that the foreign matters enter into the gap 57.

FIGS. 8 to 11 illustrates a protection structure for a spring portion of a power supply device on a sliding door side as a protection structure for a spring portion of a power supply device according to a second embodiment of the present invention.

Figure 8:
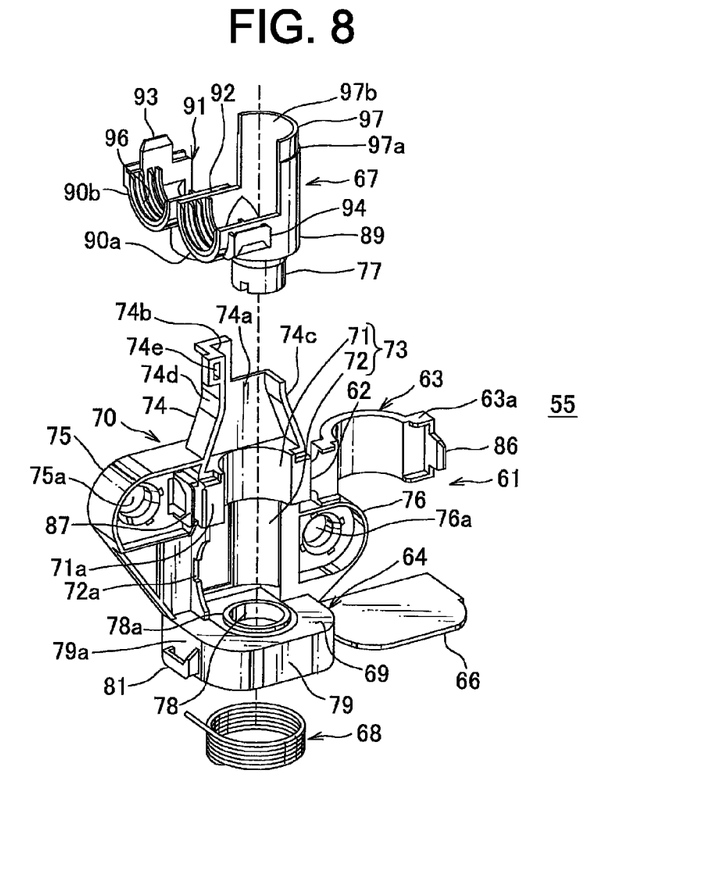
FIG. 8 illustrates a protection structure for a spring member of a power supply device according to a second embodiment of the present invention and is an exploded perspective view illustrating the protection structure for the spring portion of the power supply device on a sliding door side.
Figure 9:
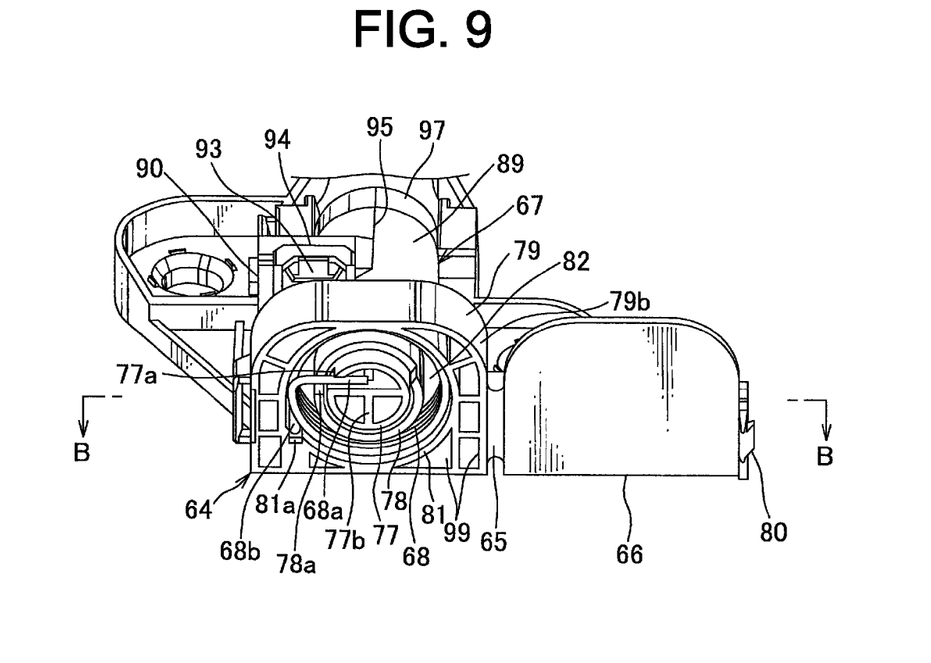
FIG. 9 is a perspective view illustrating a state in the middle of assembly of the power supply device when viewed from below, similarly.

As illustrated in FIGS. 8 and 9, a power supply device 55 includes a longitudinal synthetic resin-made base member 70, a side cover (holding member) 63 which is openably and closably connected to an upper side of the base member 70 with a thin hinge 62 in a horizontal (forward and backward) direction, a cover member 64 on a synthetic resin-made hollow bottom side provided integrally with a lower side of the base member 70, a synthetic resin-made lower cover 66 which is openably and closably connected to the cover member 64 with a thin hinge 65 in an up-down direction and covers a lower opening 99 (see FIG. 9) of the cover member 64, a synthetic resin-made rotary member 67 which is assembled to the base member 70 and the cover member 64 and thus is rotatably held in the side cover 63 in the horizontal direction, and a metallic annular torsion coil spring (spring member or spring portion) 68 which is mounted in the cover member 64 and thus is covered from the lower side and protected by the lower cover 66.

The base member 70 includes a semi-annular portion 73 of a semi-circular cross-section provided integrally at the center in a width direction, a harness lead-out portion 74 of a rectangular cross-section provided integrally at the upper side of the semi-annular portion 73 and gradually reduced in width in an upward tapered shape, and fixing portions 75 and 76 provided integrally at both front and back sides of the semi-annular portion 73. The bottom cover member 64, that is, a spring housing portion has an upper horizontal board portion 69, and the base member 70 is integrally erected on a left end side of the board portion 69. A support body 61 is configured to support the rotary member 67 with the base member 70 and the cover member 64 orthogonal to the base member 70 from the side and the below. The support body 61 is referred to as a base member, and the base member 70 can be also referred to as an erected wall with respect to the cover member 64.

A cylindrical bearing wall 78 of a circular cross-section vertically penetrates into the center of the approximately rectangular board portion 69 of the bottom cover member (spring housing portion) 64 and is thus provided integrally therewith to rotatably support a lower shaft portion 77 of the rotary member 67, and a circular annular rib 78a on an upper end of the bearing wall 78 is projected upward from the upper surface of the board portion 69. A lower end of the bearing wall 78 is positioned at the same horizontal plane as a lower end of a vertical outer peripheral wall 79 of the bottom cover member 64. A frame piece 81 is provided on an outer surface of the back sidewall 79a of the outer peripheral wall 79 in the cover member 64 and is engaged with a locking claw portion 80 (see FIG. 9) on one side end of the lower cover 66. For example, the shape of these locking units 80 and 81 can be appropriately set.

Figure 10:
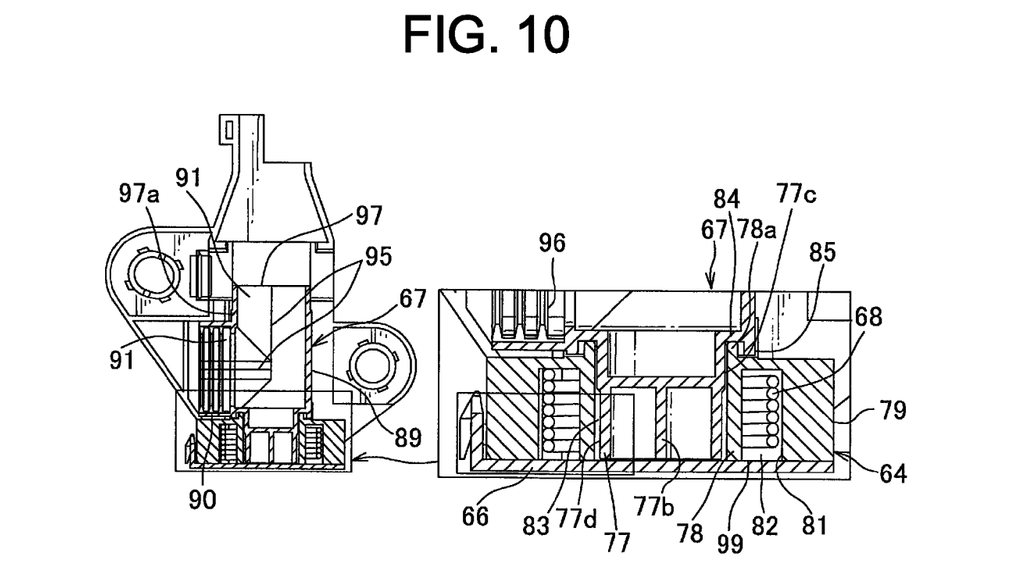
FIG. 10 is a cross-sectional view illustrating the assembly state of the power supply device when viewed in the arrow direction by taking along the line B-B in FIG. 9 (the inside of the frame illustrates an enlarged view).

As illustrated in FIGS. 9 and 10, an annular partition wall 81 is provided concentrically with the outside of the cylindrical bearing wall 78 inside the bottom cover member (spring housing portion) 64, a torsion coil spring 68 is housed in an annular downward groove portion (vacant chamber) 82 between the bearing wall 78 and the partition wall 81, a wide cutout portion 78a is provided in the bearing wall 78 to lock an inward protruding end 67a on the lower end of the torsion coil spring 68, a slit-like groove 81a is provided in a tangential direction of the partition wall 81 to lock an outward protruding end 68b on the upper end of the torsion coil spring 68, and a slit-like cutout portion 77a is provided in the lower shaft portion 77 of the rotary member 67 to lock an inward protruding end 68a on the lower end of the torsion coil spring 68.

The lower shaft portion 77 of the rotary member 67 includes a hollow cylindrical portion (substituted by reference numeral 77) and a reinforcing rib 77b formed in the cylindrical portion with a cross shape. A circular wound portions of the torsion coil spring 68 is disposed along the inner peripheral surface of the partition wall 81, the rotary member 67 is backward (in a clockwise direction in FIG. 8) biased by force of the torsion coil spring 68, and the torsion coil spring 68 is reduced in diameter against the spring force as the rotary member 67 (in a counterclockwise direction in FIG. 8) rotates forward.

The lower cover 66 of the bottom cover member 64 is connected to a lower end of a front sidewall 79b of the outer peripheral wall 79 in the cover member 64 with a thin hinge 65 and is formed to have the same size and shape as the lower end of the outer peripheral wall 79, so that the shaft portion 77, the bearing wall 78, the partition wall 81, or the torsion coil spring 68 is completely covered by the cover member 64 in the closed state of the lower cover 66, thereby preventing the entry of foreign matters such as dust, sand, or water from outside (lower side).

Figure 11:
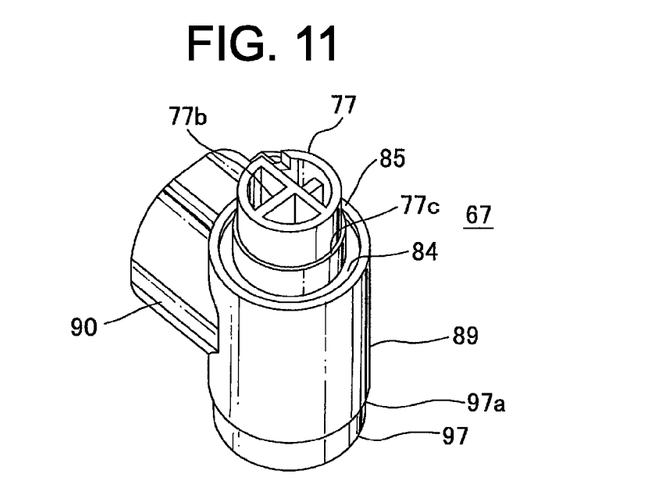
FIG. 11 is a perspective view illustrating a state where a rotary member of the power supply device is vertically reversed.

As illustrated in FIG. 10, a slightly large-diameter outer peripheral surface 77c on an upper half of the lower shaft portion 77 of the rotary member 67 come in rotatably and slidably contact with an upper half of the inner peripheral surface of the cylindrical bearing wall 78 in the cover member 64, and a gap 83 is formed between the inner peripheral surface on a lower half of the bearing wall 78 and a slightly small diameter outer peripheral surface 77d on a lower half of the shaft portion 77. As illustrated in FIGS. 10 and 11, the large-diameter upper half 77c of the lower shaft portion 77 is orthogonal to an annular narrow bottom wall 84 of the rotary member 67, an annular rib 85 is projected concentrically with the shaft portion 77 on a lower surface of the bottom wall 84, a tip (upper end) of the annular rib 78a on the upper end of the bearing wall 78 comes in rotatably and slidably contact with the lower surface of the annular bottom wall 84 in the rotary member 67, the downward annular rib 85 of the bottom wall 84 is positioned closer to the outside of the upward annular rib 78a of the bearing wall 78, and both of the annular ribs 78a and 85 constitute a labyrinth structure, thereby preventing the entry of the foreign matters into the outer peripheral surface of the lower shaft portion 77.

Even in a case where the foreign matters enter toward the outer peripheral surface of the shaft portion 77 by riding over the upward rib 78a of the bearing wall 78, the foreign matters fall into the gap 83 between the inner surface of the bearing wall 78 and the small diameter outer peripheral surface 77d on the lower half of the shaft portion 77 and are housed therein, so that there is no concern that the foreign matters adversely affect the large diameter sliding contact surface 77c on the upper half of the shaft portion 77. In addition, in this case, since the lower end of the bearing wall 78 and the upper surface of the lower cover 66 come in closely contact with each other, the entry of the foreign matters into the outside of the bearing wall 78, that is, the groove portion 82 serving as a spring housing space is also prevented.

As illustrated in FIG. 8, the semi-annular portion 73 positioned at the center in the width direction of the base member 70 is made up of a lower-half large diameter curved wall portion 72 formed longer in the up-down direction and an upper-half small diameter curved wall portion 71 formed shorter in the up-down direction, and the semi-annular side cover (holding member) 63 is openably and closably connected to one side end (front end) of the upper-half curved wall portion 71 with the thin hinge 62. The locking claw portion 86 is provided on a rotating tip side of the side cover 63 and the frame piece 87 is provided closer to the fixing portion 75 on the back side of the base member 70 and is engaged with the claw portion 86. For example, the shape of these locking units 86 and 87 can be appropriately set.

Positioning and backlash preventing flange portions 63a are provided up and down on front and back ends of the side cover 63 and are engaged with upper and lower ends of front and back wall portions 71a having a block shape of the upper semi-annular portion 71. A stopper wall 72a is formed on a back end of the lower semi-annular portion 72 and comes in closely contact with the rotary member 67 at a backward rotating end position. The side cover 63 or the lower cover 66 can be formed separately from the base member 70 or the cover member 64 (in this case, however, it is an undeniable fact that assemblability of the power supply device 55 deteriorates).

A back fixing portion (bracket portion) 75 of the base member 70 has a fixing hole portion 75a on an upper side thereof into which bolts or locking clips are inserted, and a front fixing portion (bracket portion) 76 is disposed at a lower side of the side cover 63 in the opened state and has a fixing hole portion 76a, similarly.

Figure 12:
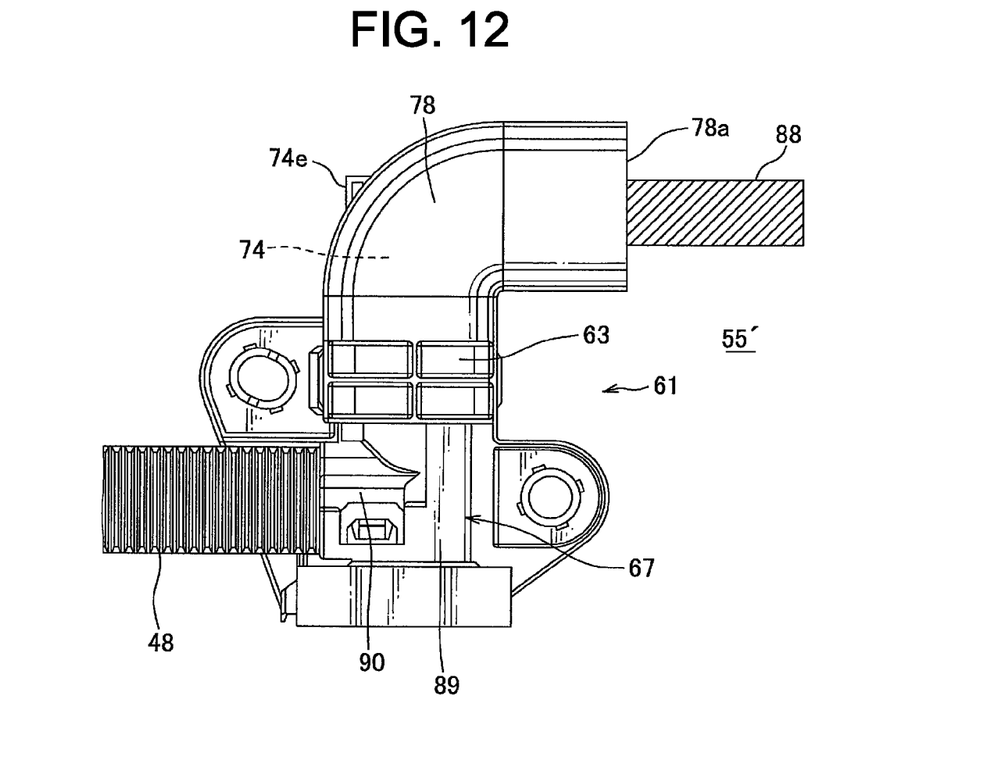
FIG. 12 is a front view illustrating a preferred modification example of an upper portion of the power supply device.

A harness lead-out portion (lead-out wall) 74 on a center upper portion of the base member 70 is made up of a vertical rear wall 74a and front and back sidewalls 74c and 74d which is orthogonal to the rear wall 74a and by which the upper portion opening 74b is reduced in width with a truncated chevron shape, a fixing hole (harness fixing portion) 74e is provided at an upper portion of the back sidewall 74d to fix an upward electric wire portion 88 (see FIG. 12)

of the wire harness with a binding band or the like, the front sidewall 74c is cut out low together with the rear wall 74a. A plurality of reinforcing ribs (not illustrated) is vertically and horizontally provided on a rear side (left end surface) of the base member 70.

As illustrated in FIGS. 8 to 11, the rotary member 67 includes a cylindrical wall portion 89 having a longitudinally circular cross-section and a cylindrical wall portion (harness lead-out portion) 90 having a transversely circular cross-section which is orthogonal to the middle portion of the cylindrical wall portion 89 in a height direction, a left-half upper portion of the longitudinally cylindrical wall portion 89 and an upper half of the transversely cylindrical wall portion 90 are formed as a cylindrical wall portion 91 having a half-split shape, which is bent in an L shape, to enhance insertion workability of the wire harness, half-split lower half 90a and upper half 90b forming the transversely cylindrical wall portion 90 are openably and closably connected to each other with a thin hinge 92 on one side, a locking claw portion 93 is provided on the other side of the upper half 90b, and a frame piece 94 is provided on the other side of the lower half 90a and is engaged with the claw portion 93. The configuration of these locking units (locking portion and locked portion) such as the claw portion 93 and the frame piece 94 can be appropriately set.

In FIGS. 9 and 10, a split surface (joint surface) of the cylindrical wall portions 89 and 90 having the half-split shape is indicated by reference numeral 95. As illustrated in FIGS. 8 and 10, a plurality of ribs 96 are projected in parallel on the inner peripheral surface on the protruding end side of the transversely cylindrical wall portion 90 to hold the end (the other end) of a corrugated tube 48 (see FIG. 12) of the wire harness.

The lower small-diameter shaft portion 77 is formed integrally with the bottom of the longitudinally cylindrical wall portion 89 at a side lower than the transversely cylindrical wall portion 90. As illustrated in FIG. 11, the lower shaft portion 77 is orthogonal to the circular horizontal bottom wall 84 of the longitudinally cylindrical wall portion 89, an annular rib 85 for a labyrinth is provided on a peripheral edge of the bottom wall 84, an annular groove (substituted by reference numeral 84) is formed between the annular rib 85 and the shaft portion 77 such that the upward annular rib 78a of the cover member 64 is slidably engaged therewith.

The outer peripheral surface on the upper portion of the longitudinally cylindrical wall portion 89 is formed to have a slightly small diameter, thereby constituting an upper hollow shaft portion 97. A step portion 97a is formed between the small-diameter outer peripheral surface of the upper shaft portion 97 and the large diameter outer peripheral surface of the longitudinally cylindrical wall portion 89, the outer peripheral surface of the upper shaft portion 97 is rotatably supported in the inner surface of the semi-annular upper wall 71 of the base member 70 and the inner surface of the side cover 73 illustrated in FIG. 8. The upper shaft portion 97 is formed shorter to enhance the sliding contact property in the circumferential direction.

As illustrated in FIG. 12, a tube portion 78 bent in an L shape is formed integrally with the upper harness lead-out portion 74 of the base member 70, which preferably prevents the entry of the foreign matters from above. In this case, the right and left half-split tube portions 78 bent in the L shape are provided integrally with the harness lead-out portion 74 and the side cover 63 illustrated in FIG. 8, respectively, the rotary member 67 is rotatably held between the side cover and the center curved wall 71 (see FIG. 8) of the base member 70 in the horizontal direction when the side cover 63 (right half-split tube portion 78) is closed, the right and left half-split tube portions 78 are joined to each other, thereby forming the L-shaped tube portion 78, and a plurality of electric wires 88 of the wire harness led out from an upper opening 97b (see FIG. 8) of the rotary member 67 are arranged in the L-shaped tube portion 78 and are thus bent in the horizontal direction, thereby being led into the sliding door from an opening 78a on a front end (alternatively, back end) of the L-shaped tube portion 78.

In FIG. 12, an end of the corrugated tube 48 of the wire harness is held in the transverse harness lead-out portion 90 on a side of the rotary member 67. The corrugated tube 48 is biased toward the back side of the vehicle by the torsion coil spring 68 together with the rotary member 67 in a free state. A power supply device is indicated by reference numeral 55' in FIG. 12.

As illustrated in the right of FIG. 6, when the sliding door 54 is fully closed, the torsion coil spring 68 of the power supply devices 55 on the sliding door side biases the wire harness 48 toward the outside (sliding door side) of the vehicle together with the rotary member 67, so that the wire harness 48 is smoothly and reliably bent in a substantially S-shape without being buckled when sliding door 54 is half-opened as illustrated in the center of FIG. 6 from the fully closed state. Similarly, as illustrated in the left of FIG. 6, when the sliding door 54 is fully opened, the torsion coil spring 68 of the power supply devices 55 on the sliding door side biases the wire harness 48 toward the rear side of the vehicle together with the rotary member 67, so that the wire harness 54 is smoothly and reliably bent in a substantially S-shape without being buckled when sliding door 54 is half-opened as illustrated in the center of FIG. 6 from the fully opened state.

Although the above-described embodiments describe the case where the power supply device 1 is mounted on the vehicle body 53 of the automobile and the case where the power supply device 55 is mounted on the sliding door 54 of the automobile, respectively, as an example, these power supply devices 1 and 55 can be applied to a sliding door for vehicles other than the automobile or a sliding door, a slide member, or the like for apparatuses other than the vehicles, for example. The vehicle body 53, an apparatus body, or the like is collectively referred to as a fixed structure body and the sliding door 54, the slide member, or the like is collectively referred to as a sliding structure body.

Further, in the above-described embodiments, the power supply device 1 illustrated in FIGS. 1 to 5 can be mounted on the sliding door 54 side, and the power supply device 55 illustrated in FIGS. 8 to 12 can be mounted on the vehicle body 53 side. In addition, other resin tubes having good bendability can be used instead of the corrugated tube 48 or a plurality of electric wires can be bound to be used without using a protective tube such as the corrugated tube, and, in this case, the end of the wire harness is sandwiched and held in a watertight manner in the harness lead-out portion 21 of the rotary member 5 and the harness lead-out portion 90 of the rotary member 55.

In addition, the protection structure for the spring portion of the power supply device according to each of the embodiments described above is valid as a water/dust-proof (dust-proof and waterproof) structure or is also valid as a power supply device itself.

INDUSTRIAL APPLICABILITY

The protection structure for the spring portion of the power supply device according to the present invention can be used to prevent the adhesion of the foreign matters such as dust, sand, or water to the spring member and thus to smoothly and reliably perform the biasing operation of the swinging member with the spring member over a long period in the power supply device for biasing the swinging member in any one of swing directions with the spring member.

REFERENCE SIGNS LIST 1, 55: power supply device
2, 70: base member
4, 64: cover member
5, 67: rotary member
6, 68: torsion coil spring (spring member)
42, 82: annular groove portion
66: lower cover
99: lower opening

The invention claimed is:

1. A protection structure for a spring portion of a power supply device comprising:
   a base member;
   a cover member provided integrally with or separately from the base member;
   a rotary member supported swingably by the base member and the cover member and leads out and holds a wire harness; and
   an annular spring member biasing the rotary member in any one of swing directions,
   wherein the spring member is housed inside the cover member so that foreign matters are prevented from adhering to the spring member from the outside.

2. The protection structure for the spring portion of the power supply device according to claim 1, wherein
   the cover member is disposed at an upper side of the rotary member,
   a downward annular groove portion is provided inside the cover member and houses an upper half of the spring member, and
   an annular groove portion facing the downward annular groove portion is provided inside an upper portion of the rotary member and houses a lower half of the spring member.

3. The protection structure for the spring portion of the power supply device according to claim 1, wherein
   the cover member is disposed at a lower side of the rotary member,
   a downward annular groove portion is provided inside the cover member and houses the spring member, and
   a lower opening of the cover member is covered with a lower cover.

* * * * *